United States Patent [19]
Lange

[11] Patent Number: 4,637,193
[45] Date of Patent: Jan. 20, 1987

[54] CONNECTING APPARATUS

[75] Inventor: Fredric A. Lange, Osseo, Minn.

[73] Assignee: Interlock Structures International, Inc., Minneapolis, Minn.

[21] Appl. No.: 712,229

[22] Filed: Mar. 15, 1985

Related U.S. Application Data

[63] Continuation-in-part of Ser. No. 590,738, Mar. 16, 1984, abandoned.

[51] Int. Cl.⁴ .............................................. E04H 12/00
[52] U.S. Cl. ...................................... 52/648; 403/171; 403/176; 403/381
[58] Field of Search ............... 403/381, 331, 172, 171, 403/176; 52/646, 648; 182/178

[56] References Cited

U.S. PATENT DOCUMENTS 1,019,778 3/1912 Fredrickson .
2,060,548 11/1936 Bolling .
2,149,844 3/1939 George .
2,948,409 8/1960 Wroblewski .
3,552,056 1/1971 Meates .
3,901,613 8/1975 Andersson .
3,914,060 10/1975 Miller et al. .
4,019,298 4/1977 Johnson, IV .
4,023,913 5/1977 Berkowitz .
4,044,497 8/1977 Bettens .
4,313,687 2/1982 Apeztequi .
4,340,318 7/1982 Bush .
4,343,562 8/1982 Almeland .

FOREIGN PATENT DOCUMENTS 2326736 12/1974 Fed. Rep. of Germany .
1027229 5/1953 France .
1294500 4/1962 France .
6704463 9/1968 Netherlands .

OTHER PUBLICATIONS

Metro System brochure, by Unistrut (GTE), 35005 Michigan Avenue West, Wayne, MI 48184.

Primary Examiner—Andrew V. Kundrat
Attorney, Agent, or Firm—Merchant, Gould, Smith, Edell, Welter & Schmidt

[57] ABSTRACT

Interconnecting apparatus (10) for a pair of structural members or space frame assemblies is disclosed. Apparatus (10) includes a button (12) attached to an end of one structural member and a receiver (18) attached to the end of another structural member. Receiver (18) includes a cradle (38) with a wall (40) on one side and a lip (42) on the other. Button (12) fits snugly into cradle (38) between wall (40) and lip (42) and is retained there by a locking mechanism, such as clip (24). Interconnect mechanism (10) may be used in a variety of applications including connecting a pair of trusses together and creating a space frame structure.

15 Claims, 10 Drawing Figures

CONNECTING APPARATUS

The present application is a continuation-in-part of pending application Ser. No. 590,738, filed Mar. 16, 1984 now abandoned.

FIELD OF THE INVENTION

The present invention is directed to connecting apparatus between structural members, such as structural tubes, trusses, space frame nodes and other such structural assemblies.

BACKGROUND OF THE INVENTION

A truss is understood to comprise a plurality of parallel tubes, bars, rods or other straight members held spaced apart at various points along the length of each of the members in order to form a stronger structural member than each member would be individually. For fabrication or other reasons, the trusses have lengths which are usually shorter than a span across which they are to extend. Consequently, it is necessary to connect trusses end to end and, also, to connect end trusses to structural walls or other such items. The almost universal mechanism for making such a connection is to bolt one truss to another or to bolt the truss to a structural wall. Nut and bolt connections are positive, and structural adequacy is easily verified. The disadvantage with nut and bolt connections is that they are time consuming to accomplish and, consequently, expensive.

A space frame commonly includes a plurality of nodes and tubes in various arrangements depending on the application. Space frames are used to support roofs, walkways, scaffolding, and often provide modern looking structural support in architecturally pleasant buildings such as halls, churches, office buildings, etc. More particularly, a space frame is constructed by a single tube extending between a pair of nodes. Each node has a plurality of faces and can receive a tube at each face. Therefore, it is common for a number of tubes to be attached to a single node so that a complex, but usually uniform, pattern is formed.

Representative connecting devices are shown in a number of patents. For example, U.S. Pat. No. 2,149,844 shows a sleeve device into which one or more tubes may be inserted and welded. U.S. Pat. No. 4,343,562 shows a somewhat different structure but also utilizes the concept of inserting a tubular member into a core member and welding the two. Other patents show different concepts. For example, U.S. Pat. No. 3,914,060 shows a node member having a plurality of studs with sleeves attached thereto for threading onto ends of tubular sections. U.S. Pat. No. 4,023,913 shows a connector having socket-like ends over which tubular members fit. U.S. Pat. No. 4,313,687 shows a node having a plurality of threaded openings, each of which are for receiving a bolt retained to an end of a tube. A pair of threaded bodies attached to the bolt function to tighten the tube to the node. Other commercial systems are available which actually have a threaded rod fixed at the end of a tube for threading into a threaded opening in a node. Finally, still a different concept is shown in U.S. Pat. No. 4,340,318 wherein a node connection includes a plurality of half joints having semicircular tongue and groove elements with tubes having similar tongue and groove elements mating therewith. Locking latches are provided to keep the halves from separating.

Some of these various connectors are less complex than others, and some are less expensive to make and use. In general, however, various presently known connectors require a significant amount of work time to complete the connection. That is, a welder must weld, or a laborer must thread one piece to another. U.S. Pat. No. 4,340,318 perhaps requires a lesser amount of assembly time, but likely is fairly expensive to manufacture due to the complex design of the tongue and groove assembly and the locking latch assembly.

Thus, although numerous connecting assemblies are known, there continues to be a need for improvements which will simplify and make less expensive without decreasing structural strength or reliability. In this regard, the present invention advances connector art significantly.

SUMMARY OF THE INVENTION

The present invention is directed to interconnect mechanism between first and second structural members. The mechanism includes a button fastened to the first structural member. The mechanism further includes a receiver for the button formed as an arcuately shaped cradle having a wall on one side and a lip on an opposing side. The receiver is fastened at the wall to the second structural member. In this way, receipt of the button within the cradle simply yet sufficiently interconnects the two structural members together.

More specifically, the button is generally in the form of a solid cylinder with an axial opening for allowing the shaft of a bolt to pass through. A cavity at one end of the button receives the head of the bolt. The structural tube preferably includes a solid rod plug at its end. The bolt is then threaded into the plug to fasten the button to the tube.

The receiver is also a cylindrical block, but has a cavity extending inwardly from the cylindrical wall. The cavity has a semi-cylindrical end coaxial with the axis of the block. A slot in one end of the block extending to the cavity is necessary for receiving the solid rod to which the button is fastened when the button is received by the cradle formed by the semi-cylindrical cavity. The solid end wall of the receiver has an axial passage for a bolt to pass therethrough with a cavity for the head of the bolt. As with the button, the receiver is fastened with the bolt to a solid rod welded or otherwise attached in the end of the second structural tube.

Preferably, the dimensions of the button match relatively closely the dimensions of the cavity so that the button, although loose, is snugly received in the cradle. Such connection is then not only quite solid, but provides structural strength which is predictable and can be used advantageously for design purposes.

A further feature of the present connector includes a keeping or locking mechanism for preventing the button from sliding from the cradle. Although several such locking mechanisms may be equivalent, a simple such mechanism includes a clip having one leg inserted in an opening in the receiver wall adjacent to the top of the button with another leg frictionally retained at the top of the receiver wall. Such feature is simple, rapid to assemble, and advantageously alleviates any concern of the button bouncing from the cradle under circumstances which might otherwise cause such disconnection.

The interconnection mechanism of the present invention is advantageously applicable for connecting a pair of truss members together. A button is attached to each tube or elongated member of a first truss, while receivers are attached to each elongated member of a second truss. The buttons are simultaneously placed in the cradles of the receivers and the keepers installed. The connection is simple, quick, inexpensive to make and assemble, yet relatively solid and positive.

In place of the using a locking clip, an alternative is to rotate one or more receivers after the button or buttons have been received. A spring bias plunger or some other means of preventing rotation is used in this embodiment to hold the rotated receiver from inadvertently rotating further. The receiver is advantageously knurled so that it may be readily grasped and turned preferably by hand. The plunger preferably includes a cammed device or other similar device for retracting the plunger from the cavity into which it falls to prevent further rotation. The cam and the knurled wall on the receiver alleviate the need for extraneous tools while connecting the truss members together or disconnecting them. The most advantageous alignment of rotated receivers attached to a truss member occurs when the centerline of the cradles of each of the receivers passes near the centerline of the truss member. In this case, the only way the two truss members could be unintentionally disconnected would be for the truss member with attached buttons to explode outwardly, which is unlikely.

The present connecting apparatus is further advantageous for use in creating space frame structures. A node may be formed to include a plurality of faces with receivers fastened to one or more of the faces. Tubes may then be connected thereto in the usual fashion by placing a button in a cradle and locking it in place. Thus, in a fashion similar to connecting a pair of trusses together, the creation of a space frame using the present connecting mechanism is simple and quick, yet strong and positive.

Thus, the present connecting mechanism is a significant improvement over known connectors, not only because of the simple design and consequent inexpensive manufacture, but also because of the ease of assembly, yet strength of connection and capability of preventing disconnection.

These advantages and other objects obtained by this invention are further explained and may be better understood by reference to the drawings and descriptive matter hereinafter. Preferred and other embodiments of the invention are illustrated and a detailed description is provided.

DETAILED DESCRIPTION OF THE PREFERRED EMBODIMENT

Figures 1, 2:
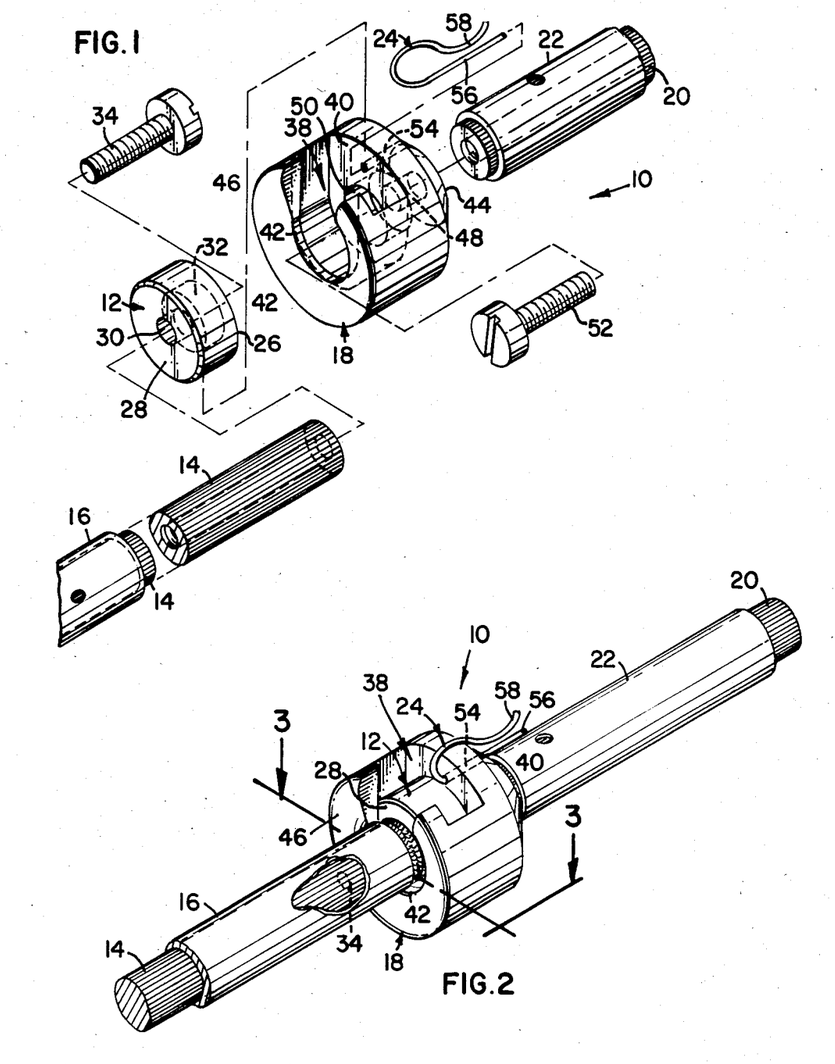
FIG. 1 is an exploded, perspective view of the interconnecting mechanism between a pair of tubes.
FIG. 2 is a perspective view of a pair of tubes connected with the interconnecting mechanism of the present invention.

In the drawings like reference numerals designate identical or corresponding parts throughout the several views. In like fashion, like numerals, only primed, are used in decription of corresponding parts for alternate embodiments and various applications. Referring now to FIG. 2, interconnecting apparatus in accordance with the present invention is designated generally by the numeral 10. Apparatus 10 includes a button 12 attached to a solid rod 14 fastened within tube 16. Button 12 is contained within receiver 18 fastened to rod 20 which is fixed to tube 22. Retainer 24 clip prevents button 12 from undesirably sliding out of receiver 18.

Figure 3:
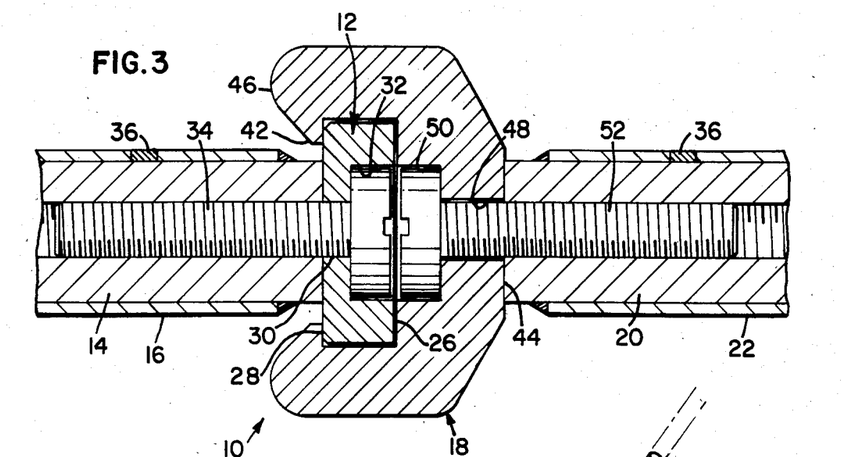
FIG. 3 is a cross-sectional view, taken along line 3—3 of FIG. 2.

More particularly, with reference to FIGS. 1-3 button 12 is a cylindrical block having a pair of ends 26, 28. Button 12 is provided with an axial passage 30 in combination with an axial cavity 32 in end 26 for receiving the shank and head of screw or bolt 34, respectively. Cavity 32 is sufficiently sized to receive the head of screw 34 so that it does not extend beyond end 26. Button 12 has sufficient thickness and diameter to retain necessary strength in spite of cavity 32 and passage 30.

Button 12 is fastened with screw 34 to rod 14. Rod 14 is a plug of several inches in length and is inserted in the end of tube 16 and attached with a plurality of randomly located spot welds 36. Preferably, rod 14 extends a short distance from the end of tube 16 so that tube 16 does not interfere with receiver 18 when button 12 is placed in receiver 18. Rod 14 provides for and strengthens the end of tube 16 for the attachment of button 12 with screw 34.

Receiver 18 is formed to include a cradle 38 with a wall 40 on one side and a lip 42 on the other. Receiver 18 is preferably a cylindrical block with ends 44, 46. End 44 may be trimmed at the corner to eliminate unnecessary mass. A sufficient flat surface, however, must be retained to butt against rod 20. Cradle 38 is formed to include a cavity extending inwardly from the cylindrical wall and ending in semi-cylindrical curvature coaxial with the axis of the block. Lip 42 results when a slot centered on the cavity of cradle 38 is formed. The slot end is semi-cylindrical, and coaxial with the axis of the block. The slot between the sides of lip 42 has width sufficient to allow rod 14 to pass therethrough. Button 12 has a diameter greater than the diameter of rod 14 so that lip 42 retains button 12 from sliding axially from cradle 38. The width and cylindrical diameter of the cavity of cradle 38 is slightly greater than the diameter of button 12 to allow button 12 to be easily received by cradle 38, while yet maintaining a relatively snug abutment. End 46 is preferably rounded with the inner portion collapsing toward lip 42 so as to leave only a relatively short thickness for lip 42. In this way, end 46 and lip 42 do not interfere with tube 16 as rod 14 passes through the slot formed by lip 42.

An axial passage 48 extends through rear wall 40. Additionally, a cavity 50 is coaxial with the axis of receiver 18. As with passage 30 and cavity 32 of button 12, passage 48 and cavity 50 of receiver 18 are sized to receive screw 52. As with the button 12, the thickness and diameter of receiver 18 are sufficient to provide the strength characteristics for a particular application. As indicated hereinbefore, end 44 of receiver 18 butts against rod 20 and is fastened thereto with screw 52. Rod 20 is a plug of several inches in length and is attached to tube 22 with a plurality of random spot welds 36 through openings in tube 22. As with rod 14, rod 20 provides for and strengthens the end of tube 22 for the attachment of receiver 18 with screw 52.

A locking mechanism, such as clip 24, is located to hold button 12 snugly in cradle 38. A number of equivalent locking mechanisms are possible, but a simple embodiment is shown to include a passage 54 in wall 40 at the top of button 12. Clip 24 has a lower leg 56 which passes through passage 54, and an upper leg 58 which retains clip 24 to the upper edge of wall 40.

Figures 5, 6:
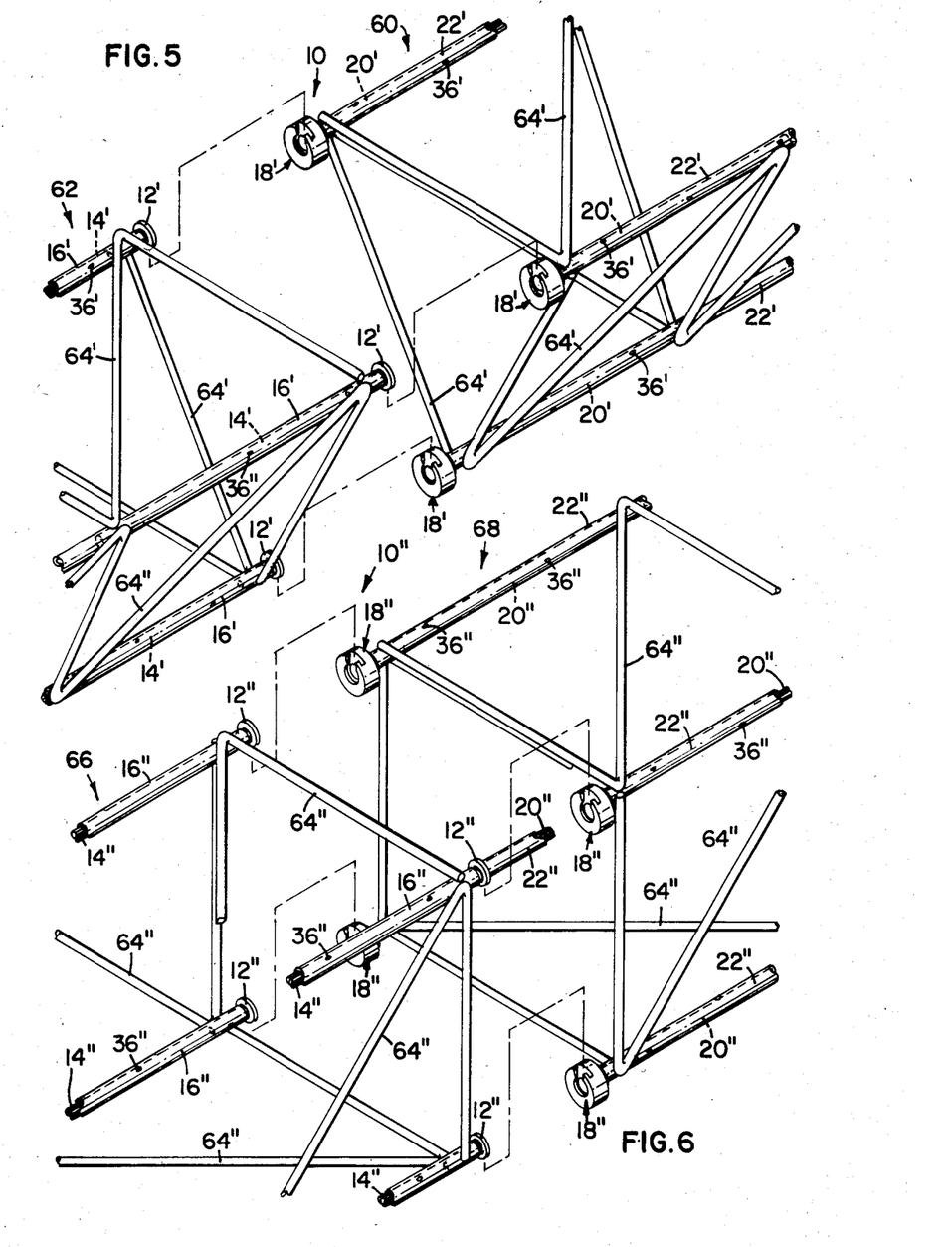
FIG. 5 is a perspective view of connecting apparatus in accordance with the present invention for a pair of triangular trusses.
FIG. 6 is a perspective view, similar to FIG. 5, for a pair of box trusses.

Connector 10 may be used to interconnect a pair of tubes 16, 22, as shown in FIG. 2. Also, a plurality of connectors 10 may be used in a similar fashion to connect a pair of trusses together as shown in FIGS. 5 and 6. Trusses 60, 62 in FIG. 5 each have three tubes 16', 22'. Various webbing rods are welded or otherwise attached to hold the tubes in a fixed, spaced-apart structural relationship. A button 12' is attached to the end of each tube 16' at a rod 14' in the fashion described hereinbefore. Similarly, a receiver 18' is attached to the end of each tube 22' at a rod 20'. With such configuration, truss 62 is connected to truss 60 by simply sliding all of buttons 12' into receivers 18' simultaneously. Appropriate lock mechanisms prevent the trusses from inadvertently separating.

Trusses 66, 68 in FIG. 6 are connected together in a similar fashion. Trusses 66, 68 each have four tubes 16", 22" connected together with webbing 64". Buttons 12" and receivers 18" are attached in the fashion described hereinbefore. All of buttons 12" are received simultaneously by receivers 18" to hold truss 66 to truss 68. A locking mechanism for each of connectors 10" prevents inadvertent disconnection.

Figure 4:
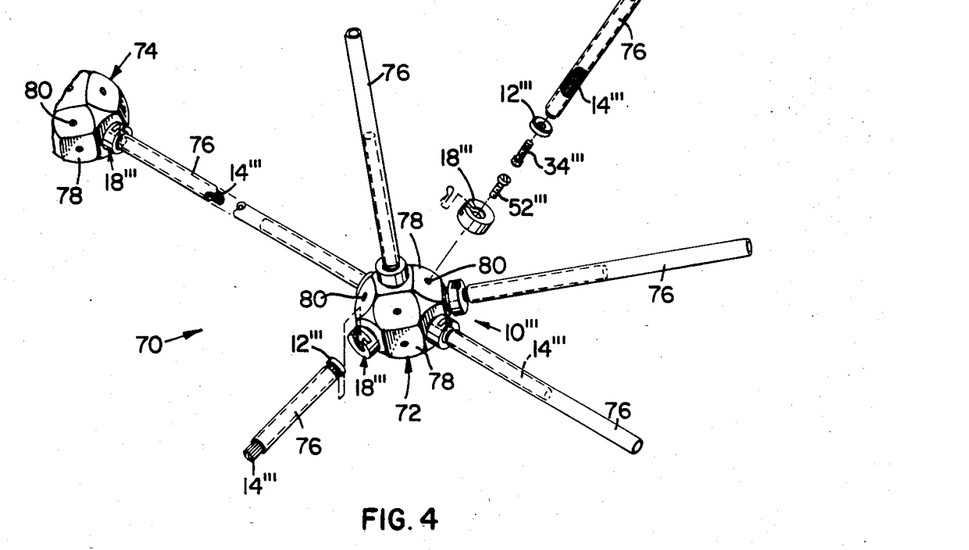
FIG. 4 is a perspective view of a portion of a space frame, showing two nodes and a plurality of connecting tubes, wherein connectors in accordance with the present invention are used.

As shown in FIG. 4, interconnect mechanism 10 may also be used in a space frame structure designated herein as 70. Space frame 70 includes nodes 72, 74. A plurality of tubes 76 extend between nodes 72, 74 and other nodes (not shown) or other structural members (not shown). Each node, for example 72, has a plurality of faces 78. Centered in each face is a threaded passage 80. A receiver a 18''' is attached to the various faces 78 which are needed for use as attachments. Receivers 18''' are attached with a screw 52''' in the same fashion as screw 52 attaches a receiver 18 to a rod 20. Tubes 76 have buttons 12''' attached at both ends in order to be received at each node. Since a node may be formed to have faces in a variety of directions and since a tube may be connected to extend generally perpendicular to any particular face, nodes and tubes may be used to create a variety of designs in the usual fasion of space frames and, consequently, may be used in any of the various applications appropriate for space frames. The present invention, however, is particularly advantageous for space frame creation since it is so rapidly assembled and disassembled, while yet maintaining structural integrity and strength.

In use, as indicated, the present interconnecting mechanism is rapidly assembled. The buttons and receivers are preattached to rods, tubes, trusses or similar structural members. At an assembly site, assemblers simply insert the buttons into the receivers so the buttons rest in the cradles of the receivers and are retained between the lips and end walls of the cradles. The buttons are locked in place using, for example, a clip 24 or some other locking mechanism. In the case of space frame assembly, receivers 18''' are attached to appropriate faces 78 of nodes. Tubes 76 with buttons 12''' at both ends are extended between a pair of nodes and slipped in the receivers and locked in the same fashion as hereinbefore indicated. Various structrual designs may be assembled since the faces of the nodes face in many directions and numerous structural tubes may be attached to each node. Disassembly of the space frame or of other structural connections using apparatus 10 is possible and rapidly accomplished simply by removing or releasing the locking device and slipping the structural members having buttons from the receivers of attached structural members. Thus, not only is diverse and rapid assembly facilitated, but disassembly is easy and reuse of the structural members and connecting devices is feasible and incredibly advantageous.

Figure 7:
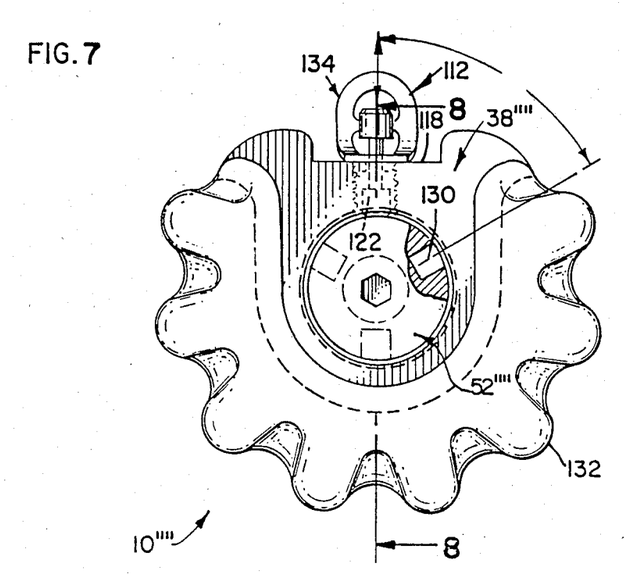
FIG. 7 is an end elevational view of an alternate embodiment of a receiver in accordance with the present invention.
Figure 8:
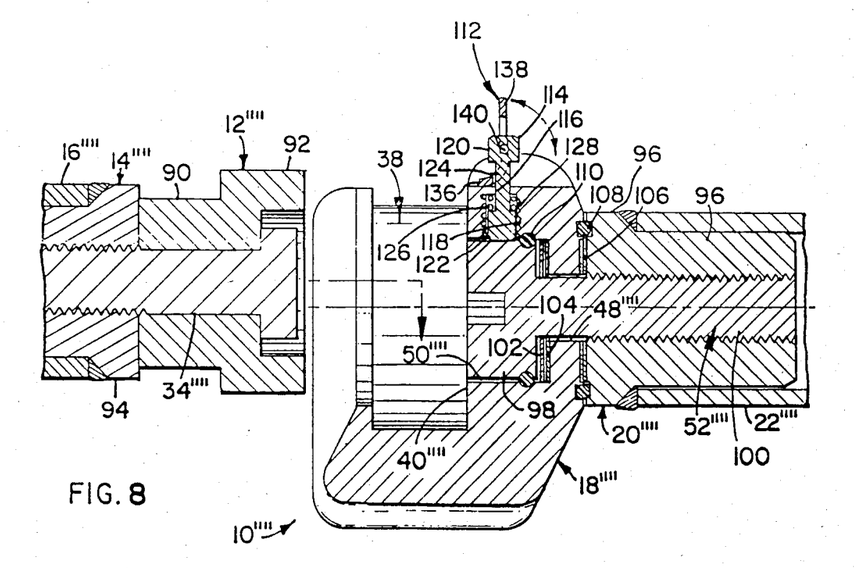
FIG. 8 is a cross-sectional view taken along line 8—8 in FIG. 7 and also showing a cross-sectional view of a button as attached to a tubular member.

As an alternative to clip 24 for locking a button in a receiver, FIGS. 7–10 show an alternate embodiment of the connecting apparatus of the present invention which provides for rotation of the receiver with respect to the member to which it is attached. Referring to FIGS. 7 and 8, connector appartus 10'''' is shown with a button 12'''' attached to a plug 14'''' in the end of a tubular member 16'''' with a bolt 34''''. In this embodiment, button 12'''' is shown to have a neck portion 90 having a smaller diameter than the diameter of the outer portion 92 which is received in receiver 18''''. Also, plug 14'''' extends somewhat beyond the end of tubular member 16'''' with the extended portion 94 having a diameter approximately equal to the outer diameter of tubular member 16''''.

Receiver 18'''' is fastened to plug 20'''' with bolt 52''''. Plug 20'''' is formed similar to plug 14'''' to have an extending portion 96 with a diameter approximately the same as the outer diameter of tubular member 22''''. Plug 20'''' is welded or otherwise attached to tubular member 22'''' as is plug 14'''' to tubular member 16''''. Receiver 18'''' is formed to include a cradle 38'''' in the fashion of cradle 38 described hereinabove. The back wall 40'''' includes a cavity 50'''' and an axial passage 48'''' for receiving the head 98 and shank 100 of bolt 52''''. A metallic bushing 102 is located between head 98 and the back wall 104 of the cavity which receives head 98. Another metallic bushing 106 is located between the facing surfaces of receiver 18'''' and plug 20''''. The metallic bushings 102 and 106 allow receiver 18'''' to be rotated without loosening bolt 52''''. In this regard, bolt 52'''' is preferably held in place with an appropriate adhesive material between its threads and the threads of plug 20'''' or with other known locking mechanism. A first O-ring seal 108 may be formed in the facing surface of either plug 20'''' or receiver 18''''. A second O-ring seal 110 may be formed in either the wall surface of cavity 50'''' or in the surface of head 98. Seals 108 and 110 enclose a space which includes bushings 102 and 106 so that a lubricant grease may be used in the space to make rotation of receiver 18'''' easier.

A mechanism for preventing rotation of receiver 18'''' is provided so that undesirable or inadvertent rotation is not possible. The preventing mechanism 112 includes a plunger 114 located along the centerline of cradle 38'''' in the outer wall 118 of receiver 18'''' in the space between cavity 38'''' and plug 20''''. A passage 116 is formed in outer wall 118 having a smaller diameter near the outer wall 118 and a larger diameter portion 120 near the cavity 50'''' for head 98 of bolt 52''''. Plunger 114 is formed to have larger diameter knobs 120 and 122 with a neck 124 therebetween. A coil spring 126 is located between wall 128 at the end of the larger diameter passage 118 and knob 122 of plunger 114 which is fitted in portion 118. Thus, plunger 114 is biased so that knob 122 is forced against head 98 of bolt 52''''.

Head 98 includes at least one cavity 130 in its cylindrical surface for receiving knob 122 of plunger 114 and thereby preventing further rotation of receiver 18'''' with respect to structural member 22''''. It is often desirable to include a plurality of equally spaced cavities 130 about head 98.

The present interconnecting apparatus may be used without the necessity of other tools to aid in connecting one structural member to another. In this regard, it is preferably to form the outer cylindrical surface 132 of receiver 18'''' with grooves or knurls so that it may be easily grasped and turned. It is also preferable to have a mechanism such as cam 134 in operable attachment to plunger 114 so that plunger 114 may be easily functioned without the need of a pliers or other tool. Cam 134 has an arcuate portion 136 near wall 118 and a straight portion 138 extending away therefrom. Cam 134 is pivotally attached to knob 120 of plunger 114 at pivot pin 140. Thus, when plunger 114 moves into a cavity 130, straight portion 138 of cam 134 forms a slight incline with wall 118. To retract plunger 114 from cavity 130, straight portion 138 is pivoted about pin 140 to force arcuate portion 136 against wall 118 and move plunger 114 radially outwardly.

Figure 9:
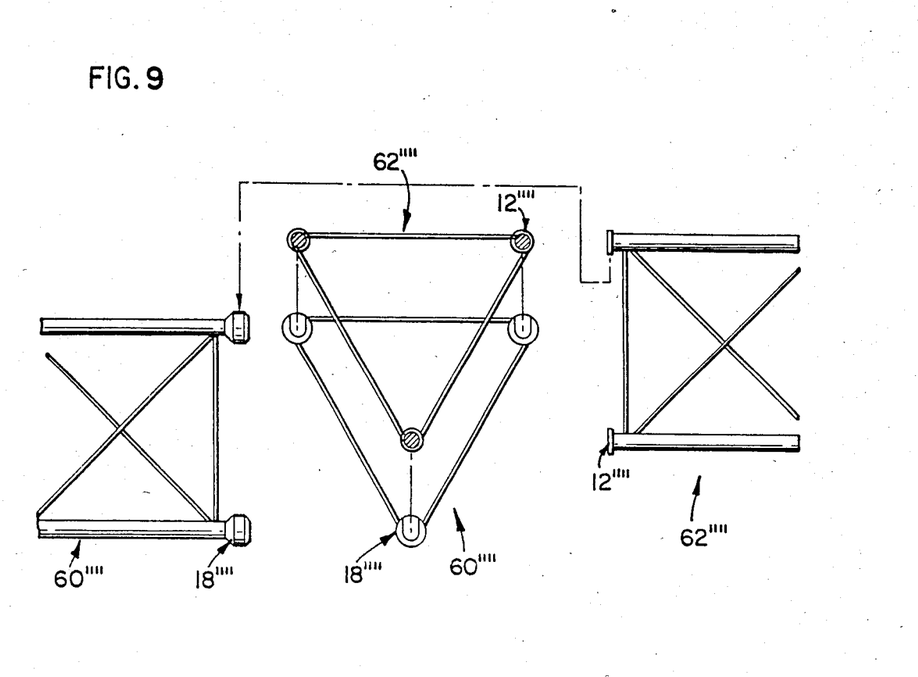
FIG. 9 shows both a side elevation and an end elevation of first and second truss members coming together for connection.
Figure 10:
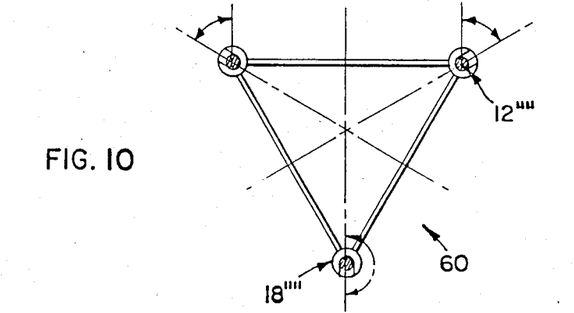
FIG. 10 shows an end elevational view of two connected truss members with one of the truss members in cross section.

In use, and in reference to connecting first and second trusses 60'''' and 62'''' together, reference is made to FIGS. 9 and 10. All receivers attached to first truss 60'''' are oriented so that the cradles open in the same direction and the centerlines of the cradles are generally parallel to one another. In this fashion, the buttons 12'''' of second truss 62'''' are easily slipped into all cradles simultaneously. Trusses 60'''' and 62'''' are locked together by rotating each receiver until further rotation is prevented by a functioning of plunger 114. Preferably, each receiver is rotated so that the cradles open outwardly from the centerline of truss 60'''' and the centerlines of the various cradles come close to intersecting near the centerline of truss 60''''. It is understood, of course, that exactness is not required with respect to the interseciton of the various cradle centerlines, but the closer such intersection comes to the centerline of truss 60'''', the more unlikely an inadvertent rotation of one or more of receivers 18'''' would occur and an inadvertent disconnection take place. Disconnection of trusses 60'''' and 62'''' is accomplished by levering the plungers 114 out of cavities 130 with cams 134 and rotating the receivers so the cradles again open in the same direction and the cradle centerlines are generally parallel. Truss 60'''' is then lifted from truss 62'''' thereby moving buttons 12'''' from receivers 18''''.

The description hereinbefore has been directed to a preferred and alternate embodiment having several applications. It is understood, however, that the structural members, rods, buttons and receivers need not be cylindrical in shape. It is only necessary that various parts mate in the sense of the embodiments described. In like fashion, it is understood that the tubes, trusses and space frame applications presented are only representative of the numerous applications possible with the present invention. Consequently, although numerous advantages and details of structure and function have been set forth, they must be considered exemplary. Changes made, especially in matters of shape, size, and arrangement, to the full extent extended by the general meaning of the terms in which the appended claims are expressed are understood to be within the principle of the present invention.

What is claimed is:

1. Interconnect mechanism between first and second structural members, said first structural member including a first tube and said second structural member including a second tube comprising:
   a button having first and second ends;
   first means for fastening said button at the first end to said first structural member, said first fastening means including a first solid rod fastened in an end of said first tube and a first bolt for fastening said button to said rod;
   means for receiving said button, said receiving means including a cradle having a wall on one side and a lip on an opposing side, said cradle being shaped to receive relatively snugly said button between said wall and said lip; and
   second means for fastening said receiving means at said wall to said second structural member, said second fastening means including a second solid rod fastened in an end of said second tube and a second bolt for fastening said cradle to said second rod;
   whereby reception of said button in said cradle interconnects said first and second structural members.

2. Connecting apparatus, comprising:
   a tube having opposite first ends;
   a cylindrical rod having a second end, said rod being fastened in one of said first ends of said tube;
   a cylindrical button attached to said second end of said rod, said button having a first diameter greater than said rod;
   means for receiving said button, said receiving means being attached to a structural member, said receiving means including a block having a cylindrical wall with first and second ends, said block having a second diameter greater than said button, said block having a cavity extending inwardly from the cylindrical wall, said cavity having a semi-cylindrical end coaxial with said block, said block having a slot in the first end for receiving said rod as said cavity receives said button, said slot having a width less than the first diameter of said button.

3. Interconnect mechanism between first and second truss members, each of said truss members including a plurality of interconnected spaced apart tubular members, said interconnect mechanism comprising:
   a plurality of buttons to include one for each tubular member of said first truss member;
   first means for fastening each of said buttons to an end of a tubular member at an end of said first truss member;
   a plurality of means for receiving said buttons to include one for each of said buttons;

second means for fastening each of said receiving means to an end of a tubular member at an end of said second truss member; and means for locking said first and second truss members together, thereby preventing said buttons from sliding from said receiving means, said locking means including means for rotating said receiving means with respect to said tubular member to which said receiving means is attached.

4. The interconnect mechanism in accordance with claim 3 wherein said first fastening means includes means for connecting said button and the first end of one of said tubular members, wherein each of said buttons is cylindrical with a first diameter, wherein said tubular members each have a first axis, and wherein each of said receiving means includes a block having an outer wall with first and second ends, said block also having a second axis, said block having a first cavity extending inwardly from the outer wall, said cavity having a back wall and a semi-cylindrical end centered on the second axis, said block further having a slot in said first end extending to and centered on said first cavity, said slot for receiving said connecting means as said first cavity receives said button, said slot having a width less than the first diameter of said button.

5. The interconnect mechanism in accordance with claim 4 wherein said second fastening means further includes a plug attached to the end of each of said tubular members and a bolt with a head and shank, said block having an axial recess in the back wall of said first cavity for receiving the head of said bolt, said plug having a threaded passage for receiving the shank of said bolt, said rotating means further including a first metallic bushing between said head of said bolt and said block and a second metallic housing between said second end of said block and said plug.

6. The interconnect mechanism in accordance with claim 5 wherein said rotating means further includes first means for sealing between said bolt and said block and second means for sealing between said block and said plug, said first and second sealing means for sealing a space to include said first and second metallic bushings, said rotating means also including a lubricant in said space.

7. The interconnect mechanism in accordance with claim 5 including means for preventing rotation of said rotating means.

8. The interconnect mechanism in accordance with claim 7 wherein said preventing means includes a second cavity in the head of said bolt, said preventing means further including a transverse passage between the axial recess in the back wall of said first cavity and the outer wall of said block, said preventing means also including a plunger for movement in said transverse passage and a spring for biasing said plunger toward the head of said bolt whereby said plunger moves into said second cavity when said plunger is aligned with said second cavity.

9. The interconnect mechanism in accordance with claim 8 wherein said preventing means further includes a cam member and means for pivotally attaching said cam member to said plunger, said cam member functioning to move said plunger from said second cavity.

10. Interconnect mechanism between first and second truss members, each of said truss members including a plurality of interconnected spaced apart tubular members, said interconnect mechanism comprising:

a plurality of buttons to include one of said buttons for each of said tubular members of said first truss member;

first means for fastening one of said plurality of buttons to an end of each of said tubular members of said first truss member;

a plurality of means for receiving said buttons to include one receiving means for each of said buttons;

second means for fastening one of said plurality of receiving means to an end of each of said tubular members of said second truss member, each of said second fastening means including means for rotating said receiving means with respect to said tubular member to which said receiving means is fastened, each of said second fastening means further including means for preventing rotation of said rotating means;

whereby said buttons fastened to said first truss member are received by said receiving means fastened to said second truss member and said receiving means is rotated utilizing said rotating means and locked with said rotation preventing means, said rotated receiving means preventing said first truss member from disconnecting with respect to said second truss member.

11. A method for connecting a first truss member to a second truss member, said first truss member having a plurality of first tubular members with buttons attached to a first end of each of said first tubular members, said second truss member having a plurality of second tubular members with a button receiving means attached to a second end of each of said second tubular members, said button receiving means being formed in the shape of a cradle, said second truss member including means for rotating each of said button receiving means, said second truss member further including means for preventing the rotation of each of said button receiving means, said second truss member having a first centerline, each of said cradles having a second centerline, said method comprising the steps of:

aligning all cradles to open in the same direction with the second centerlines being substantially parallel to one another;

moving said first truss member so that said buttons are received in the cradles of said button receiving means of said second truss member;

rotating said rotating means of at least one of said button receiving means so that all of the second centerlined of said cradles are no longer parallel with one another; and functioning said rotation preventing means to prevent said rotating means from rotating any further.

12. The method in accordance with claim 11 wherein said button receiving means are rotated with said rotating means so that said cradles open outwardly and said second centerlines of said cradles are aligned to pass near the first centerline of said second truss member.

13. Interconnect mechanism for a space frame, comprising:

a plurality of tubes each having an end and a solid rod fastened in said end;

a plurality of buttons, each of said buttons including a cylindrical disk portion;

first means for fastening each one of said buttons to one of said solid rods, each of said first fastening means including a first bolt attaching said one button to said one solid rod;

a node with a plurality of faces;

a plurality of means for receiving one of said buttons attached to one of said tubes; and second means for fastening each one of said plurality of receiving means to one of said faces, each of said second fastening means including a second bolt attaching said one receiving means to said one face of said node.

14. Interconnect mechanism for a space frame comprising:

a tube having opposite ends and a solid rod fastened in each said end;

a pair of buttons, each of said buttons including a cylindrical disk portion;

first means for fastening each one of said buttons to one of said rods, each of said first fastening means including a first bolt attaching said one button to said one solid rod;

a pair of nodes, each of said nodes having a plurality of faces, a pair of means for receiving one of said buttons, second means for fastening each of said receiving means to one of said faces of one of each of said nodes, each of said second fastening means including a second bolt attaching said one second fastening means to said one face of said one node;

whereby said tube extends between said nodes as buttons are held in said pair of receiving means.

15. The interconnect mechanism in accordance with claim 14 including means for locking said buttons in said receiving means.

* * * * *